US008179852B2

(12) United States Patent
Lee et al.

(10) Patent No.: US 8,179,852 B2
(45) Date of Patent: May 15, 2012

(54) BASE STATION, SUBORDINATED STATION AND TRANSMISSION METHOD THEREOF

(75) Inventors: Yang-Han Lee, Zhongli (TW);
 Yih-Guang Jan, Taipei (TW);
 Ming-Hsueh Chuang, Taipei (TW);
 Hsien-Wei Tseng, Fongshan (TW);
 Jheng-Yao Lin, Taipei (TW); Wei-Chen Lee, Banciao (TW); Wei-Chieh Tseng, Taipei (TW); Hsi-Chun Tseng, Pingjhen (TW); Ting-Chien Wang, Taipei (TW); Po-Jung Lin, Jhonghe (TW);
 Shiann-Tsong Sheu, Taipei (TW);
 Yung-Ting Lee, Taipei (TW); Youn-Tai Lee, Yung-Ho (TW); Hua-Chiang Yin, Taoyuan County (TW)

(73) Assignee: Institute for Information Industry, Taipei (TW)

( * ) Notice: Subject to any disclaimer, the term of this patent is extended or adjusted under 35 U.S.C. 154(b) by 477 days.

(21) Appl. No.: 12/435,792

(22) Filed: May 5, 2009

(65) Prior Publication Data
 US 2009/0274231 A1 Nov. 5, 2009

Related U.S. Application Data

(60) Provisional application No. 61/050,351, filed on May 5, 2008.

(51) Int. Cl.
 *H04W 4/00* (2009.01)
 *H04B 1/00* (2006.01)
 *H04B 1/04* (2006.01)
 *H04B 1/10* (2006.01)

(52) U.S. Cl. ............ 370/329; 455/63.1; 455/114.2; 375/346

(58) Field of Classification Search .......... 370/328, 370/329; 455/114.2, 63.1; 375/346
 See application file for complete search history.

(56) References Cited

U.S. PATENT DOCUMENTS

| 5,867,478 | A | 2/1999 | Baum et al. |
|---|---|---|---|
| 2004/0131007 | A1 | 7/2004 | Smee et al. |
| 2005/0025093 | A1* | 2/2005 | Yun et al. ............ 370/328 |
| 2006/0067205 | A1* | 3/2006 | Jung et al. ............ 370/203 |
| 2008/0094280 | A1* | 4/2008 | Fenton ............ 342/357.12 |
| 2009/0067377 | A1 | 3/2009 | Talukdar et al. |
| 2009/0168730 | A1 | 7/2009 | Baum et al. |
| 2009/0274111 | A1* | 11/2009 | Lee et al. ............ 370/329 |

OTHER PUBLICATIONS

Fig. 1 (Prior Art) prior to May 5, 2009.

* cited by examiner

*Primary Examiner* — Ronald Abelson
(74) *Attorney, Agent, or Firm* — Patterson Thuente Christensen Pedersen, P.A.

(57) ABSTRACT

A base station (BS), a subordinated station (SS) and the transmission methods thereof for use in a multi-input multi-output (MIMO) network are provided. The BS stores resource allocation information about the MIMO network and an SS list, and generate a super frame according to the resource allocation information and the SS list. The super frame comprises a pilot pattern which comprises a plurality of pilots and data. The BS and SS both considers the pilot pattern as an identifier of the SS. When there are communications occurred between the BS and the SS, the BS/SS will confirm whether the pilot pattern of the super frame matches the identifier of the SS to reduce interference from other stations in the MIMO network.

12 Claims, 18 Drawing Sheets

BASE STATION, SUBORDINATED STATION AND TRANSMISSION METHOD THEREOF

This application claims the benefit of priority based on U.S. Ser. No. 61/050,351 filed on May 5, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a base station, a subordinated station and transmission methods thereof. More specifically, the present invention relates to a base station, a subordinated station and transmission methods thereof complying with an IEEE 802.16m standard.

2. Descriptions of the Related Art

With continuous advancement in science and technology, people are imposing ever higher requirements on communications. Nowadays, more and more importance is being attached to convenience of communications in addition to requirements on quality of communications. Wireless communications are advantageous in that they provide higher mobility by obviating the need of physical communication network wiring. Therefore, wireless-communication-enabled products such as mobile phones, notebook computers and the like are more and more popular in recent years and have become the mainstream products in the consumer electronics market.

In the conventional wireless networks, there are four kinds of interference types in transmission: data transition in time division duplex (TDD), data transition in frequency division duplex (FDD), the interference in central zone edge, and the interference in cell zone edge.

Particularly, please refer to FIG. 1, which is a schematic view of a transmission cell 1 in the conventional wireless network. The transmission cell 1 comprises a plurality of central zones 100, 104, 108, a plurality of cell edge zones 102, 106, 110, a base station (BS) 101, a plurality of subordinated station (SS) 103, 105, 107, 109, 111, 113, 115, 117 corresponding to the BS 101. First, the interference of the data transition in TDD is described. In the different central zones, if down link (DL) and up link (UL) between the BS 101 and the SSs are operated at the same time, the different SSs may have interference in the data transmission.

The interference of the data transition in FDD occurs in this situation that if the different SSs operate at the same frequency, the SS may receive another SS's signal and get interference. The interference in central zone edge means that if the SS is positioned in the edge of the central zone, it may receive the two kinds of signals from the two different central zones, and one of the signals received by the SS is the interference. For example, the SS 117 may receive the two kinds of signals from the central zones 100 and 104, and one of the signals received by the SS 117 is the interference. Similarly, the SSs 109 and 113 may meet the same interference as the SS 117, and will not be described again.

Finally, the interference in cell zone edge means that if the SS is positioned in cell zone edge and the BS's signal power is lower, it may receive another BS's signal to make interference. For example, the SS 107 is positioned in the edge of the cell zone and the BS's 101 signal power is lower, the SS 107 may receive another BS's signal to make interference. Similarly, the SSs 111 and 115 may meet the same interference as the SS 107, and will not be described again.

In summary, the aforementioned interference affects the quality of communications between the BS and the SS in the wireless network seriously. How to reduce the interference in the wireless network efficiently is still an objective for the industry to endeavor.

SUMMARY OF THE INVENTION

The primary objective of the present invention is to provide a base station for use in a multi-input multi-output (MIMO) network. The MIMO network includes a subordinated station (SS) within a signal coverage of the BS. The BS comprises a storage module, a generation module and a transceiver. The storage module is configured to store resource allocation information about the MIMO network and an SS list. The generation module is configured to generate a super frame corresponding to the SS according to the resource allocation information and the SS list. The super frame comprises a pilot pattern, which is arranged as an identifier of the SS. The transceiver is configured to transmit downlink (DL) data to the SS by the super frame so that the SS may receive the DL data after confirming the pilot pattern of the super frame matches the identifier of the SS.

Another objective of the present invention is to provide a transmission method for use in a BS of an MIMO network. The MIMO network includes an SS within a signal coverage of the BS storing resource allocation information about the MIMO network and an SS list. The transmission method comprising the following steps of: generating a super frame corresponding to the SS according to the resource allocation information and the SS list, the super frame comprising a pilot pattern, which is arranged as an identifier of the SS; and transmitting downlink (DL) data to the SS by the super frame so that the SS may receive the DL data after confirming the pilot pattern of the super frame matches the identifier of the SS.

Yet a further objective of the present invention is to provide an SS for use in an MIMO network. The MIMO network comprises a BS. The SS is within a signal coverage of the BS. The BS is transmitting DL data to the SS by a super frame, which comprises a pilot pattern. The pilot pattern is arranged as an identifier of the SS. The SS comprises a transceiver and a confirmation module. The transceiver is configured to receive the pilot pattern of the super frame. The confirmation module is configured to confirm the pilot pattern of the super frame matches the identifier of the SS and then generate a confirmation result. The transceiver is further configured to receive the DL data according to the confirmation result.

Another objective of the present invention is to provide a transmission method for use in an SS of an MIMO network. The MIMO network comprises a BS. The SS is within a signal coverage of the BS, which is transmitting DL data to the SS by a super frame. The super frame comprises a pilot pattern which is arranged as an identifier of the SS. The transmission method comprises the following steps of: receiving the pilot pattern of the super frame; confirming the pilot pattern of the super frame matches the identifier of the SS; generating a confirmation result; and receiving the DL data according to the confirmation result.

The present invention arranges a pilot pattern, which comprises a plurality of pilots, of the super frame as an identifier of an SS. No matter data transition in the TDD, FDD, the central zone edge or the cell zone edge, the BS and the SS will confirm whether the pilot pattern of the super frame matches the identifier of the SS which the BS/SS attempts to communicate with. If the confirmation result is positive, the communication will be proceeded. If the confirmation result is negative, the communication will be terminated. By confirming the pilot pattern, interference of transmission in the MIMO network will be reduced effectively, and the quality of communications will be enhanced effectively.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, descriptions of these embodiments are only intended to illustrate rather than to limit the present invention. It should be appreciated that, in the following embodiments and the attached drawings, elements not related directly to the present invention are omitted from illustration; and dimensional relationships among individual elements in the attached drawings are illustrated only for ease of understanding, but not to limit the actual scale.

Figure 1:
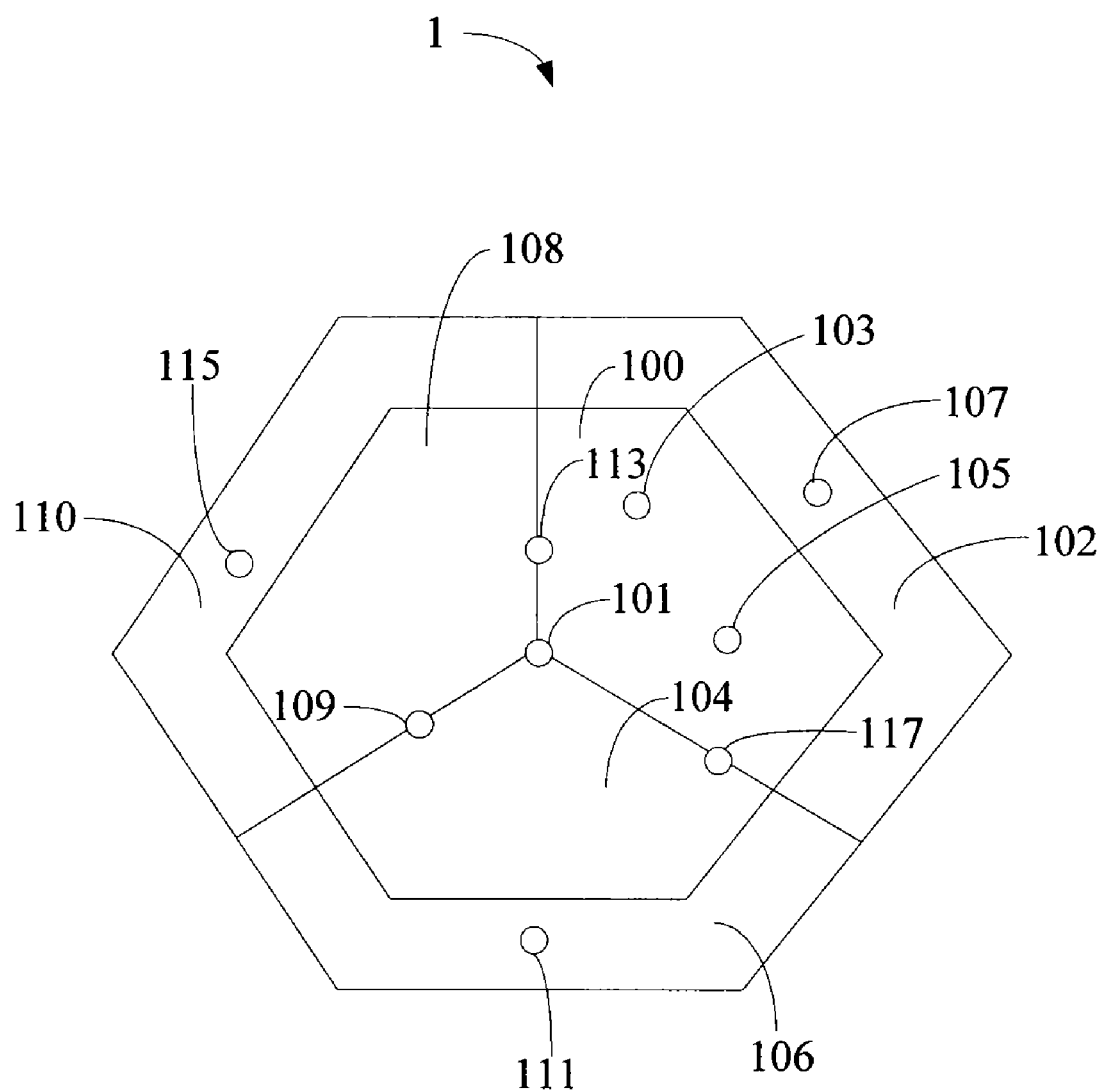
FIG. 1 illustrates a transmission cell 1 in the conventional wireless network.
Figure 2:
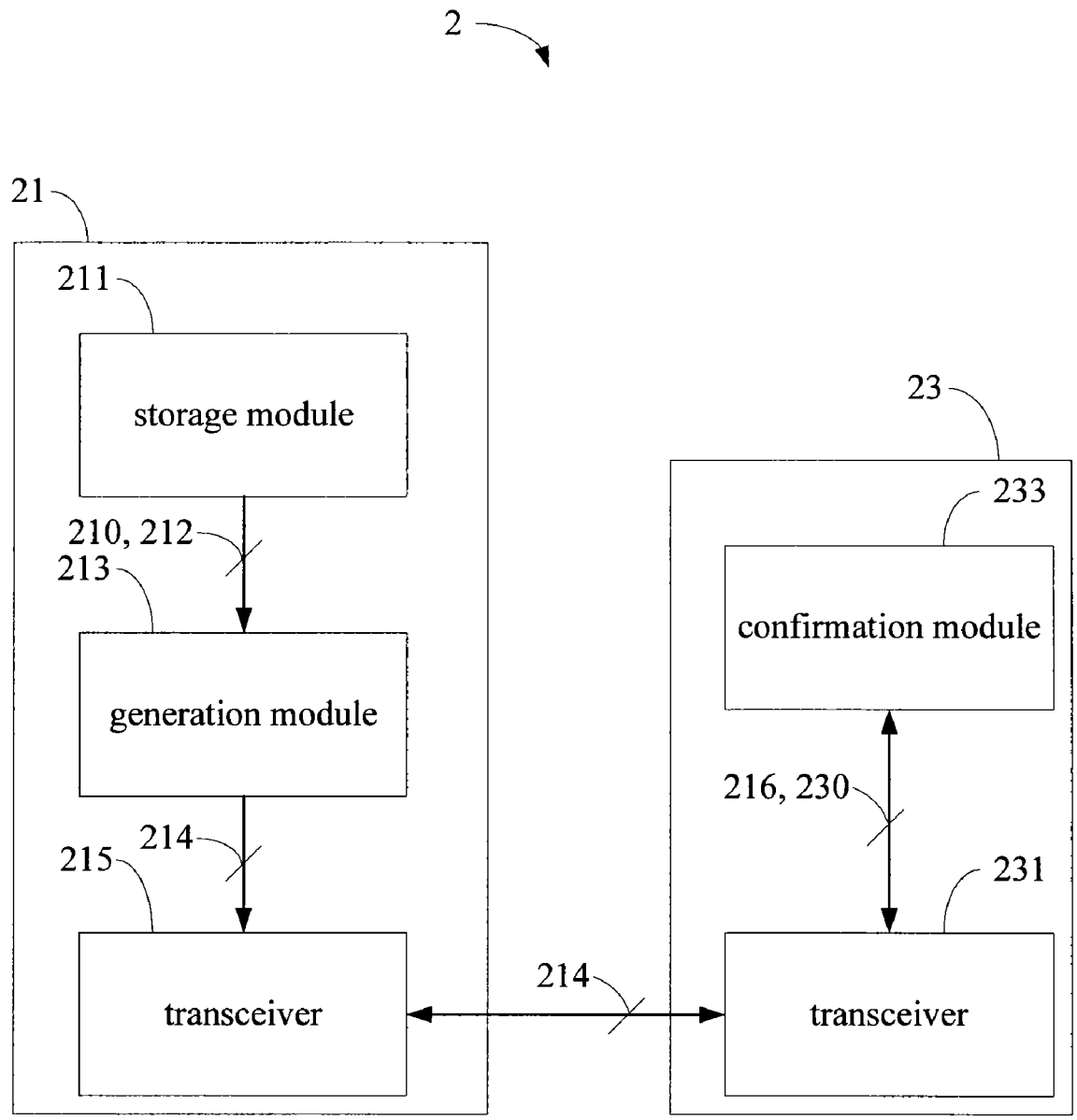
FIG. 2 illustrates a first embodiment of the present invention.

A first embodiment of the present invention is shown in FIG. 2, which is a schematic view of an MIMO network 1. The MIMO network 1 comprises a BS 21 and an SS 23. The SS 23 is within a signal coverage of the BS 21. It should be noted that, in this embodiment, the MIMO network 1 just comprises the BS 21 and the SS 23 for description convenience. In other embodiment, the MIMO network may further comprise other BSs and SSs, the operations and functions thereof are similar to those of the BS 21 and the SS 23. Peoples skilled in the art can understand easily according to the description in this embodiment.

First, the downlink (DL) transmission between the BS 21 and the SS 23 is described. The BS 21 comprises a storage module 211, a generation module 213 and a transceiver 215. The storage module 211 is configured to store resource allocation information 210 about the MIMO network 1 and an SS list 212. The resource allocation information 210 is used to records how the resource of the MIMO network 1 allocates currently. The SS list 212 is used to record the basic information, such as the identifier (ID), of all SSs (including the SS 23) in the MIMO network 1.

To transmitting DL data to the SS 23, the generation module 213 of the BS 21 is configured to generate a super frame 214 corresponding to the SS 23 according to the resource allocation information 210 and the SS list 212. The super frame 214 being generated by the generation module 213 comprises an interference-reducing (IR) zone. The IR zone comprises a pilot pattern.

Figure 3:
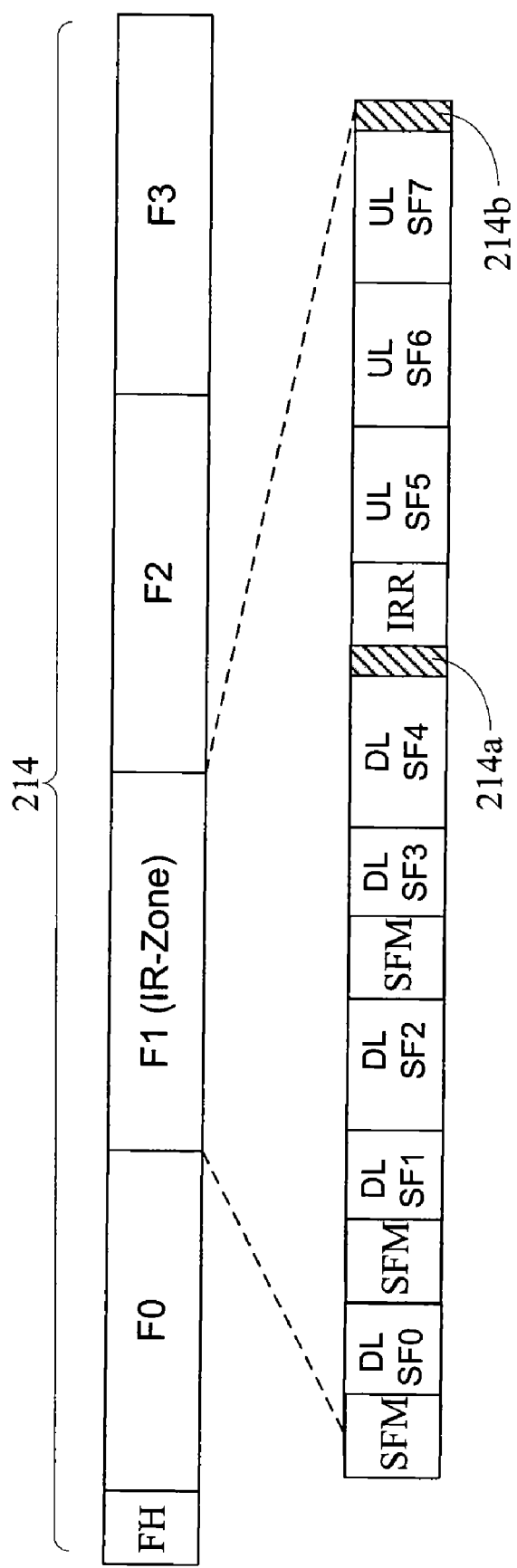
FIG. 3 illustrates the super frame of the first embodiment.

For more details, please refer to FIG. 3, which is a schematic view of the super frame 214. In FIG. 3, FH represents "Frame Header", F0-F3 represent "Frames 0-3" respectively, SFM represents "Sub-Frame Map", DLSF0-DLSF4 represent "DownLink Sub-Frames 0-4" respectively, IRR represents "Interference Reducing Request" and ULSF5-ULSF7 represent "UpLink Sub-Frames 5-7" respectively. The super frame 214 further comprises switch points 214a and 214b. In the following description, only differences from the conventional techniques will be described, and the portions of the super frame 214 identical with those of the conventional techniques are omitted from description herein and understood by peoples skilled in the art easily.

Figure 4A:
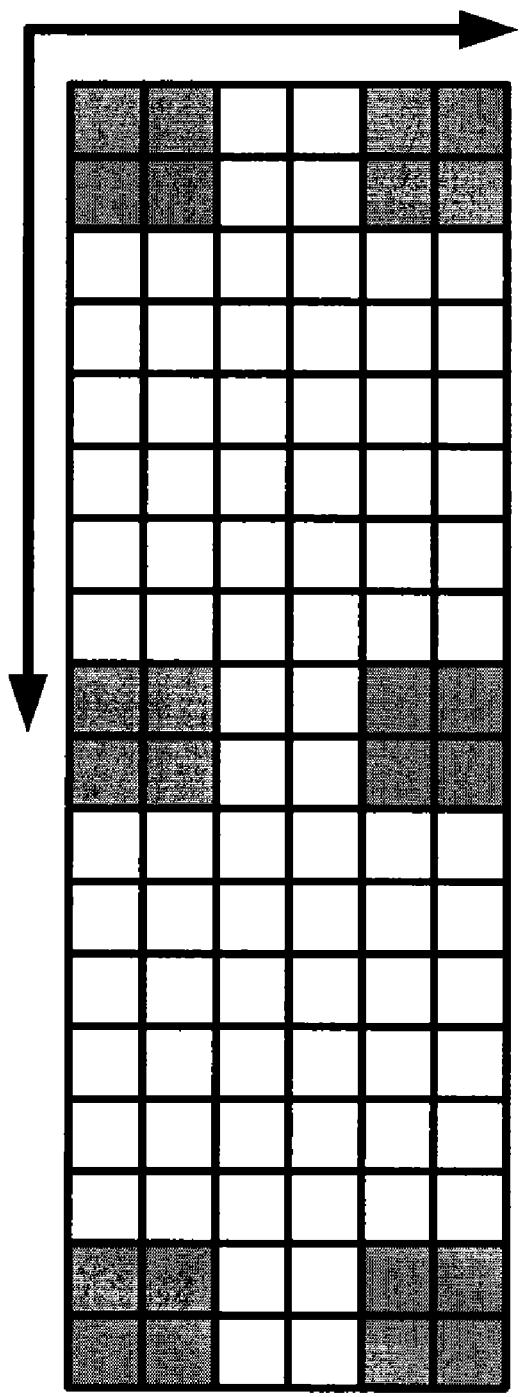
FIG. 4A illustrates a configuration of the pilot pattern of the first embodiment.

To reducing or avoiding interference of the data transmission, the present invention provides the IR zone (i.e. frame F1) in the super frame 214. The IR zone of the super frame 214 comprises a pilot pattern 216 which is arranged as an identifier of the SS 23. The pilot pattern comprises a plurality of pilots and data, where each pilot comprises mitigation information, the functions of which will be described later. The configuration of the pilot pattern may be presented as shown in FIG. 4A. In FIG. 4A, the horizontal axis represents "symbol", the vertical axis represents "subcarrier", the gray grid represents a pilot and the white grid represents data. In this embodiment, since each of the BS 21 and the SS 23 uses two antennas to communicate, the configuration of the pilot pattern will be simplified as shown in FIGS. 4B-4I which just illustrates the pilot parts of FIG. 4A.

Figure 4B:
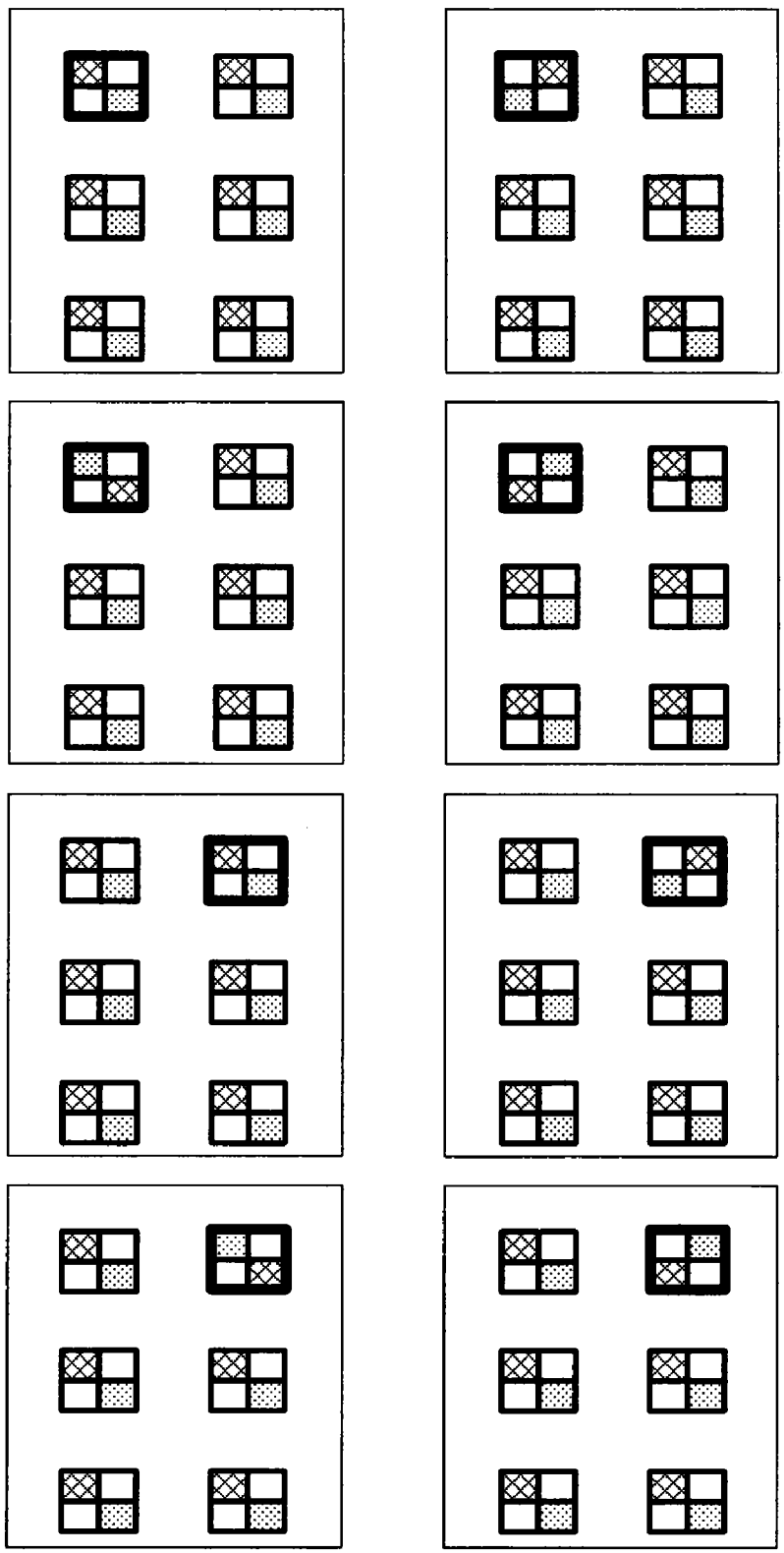
FIGS. 4B-4I illustrate variations of the configuration of the pilot pattern of the first embodiment.
Figure 4C:
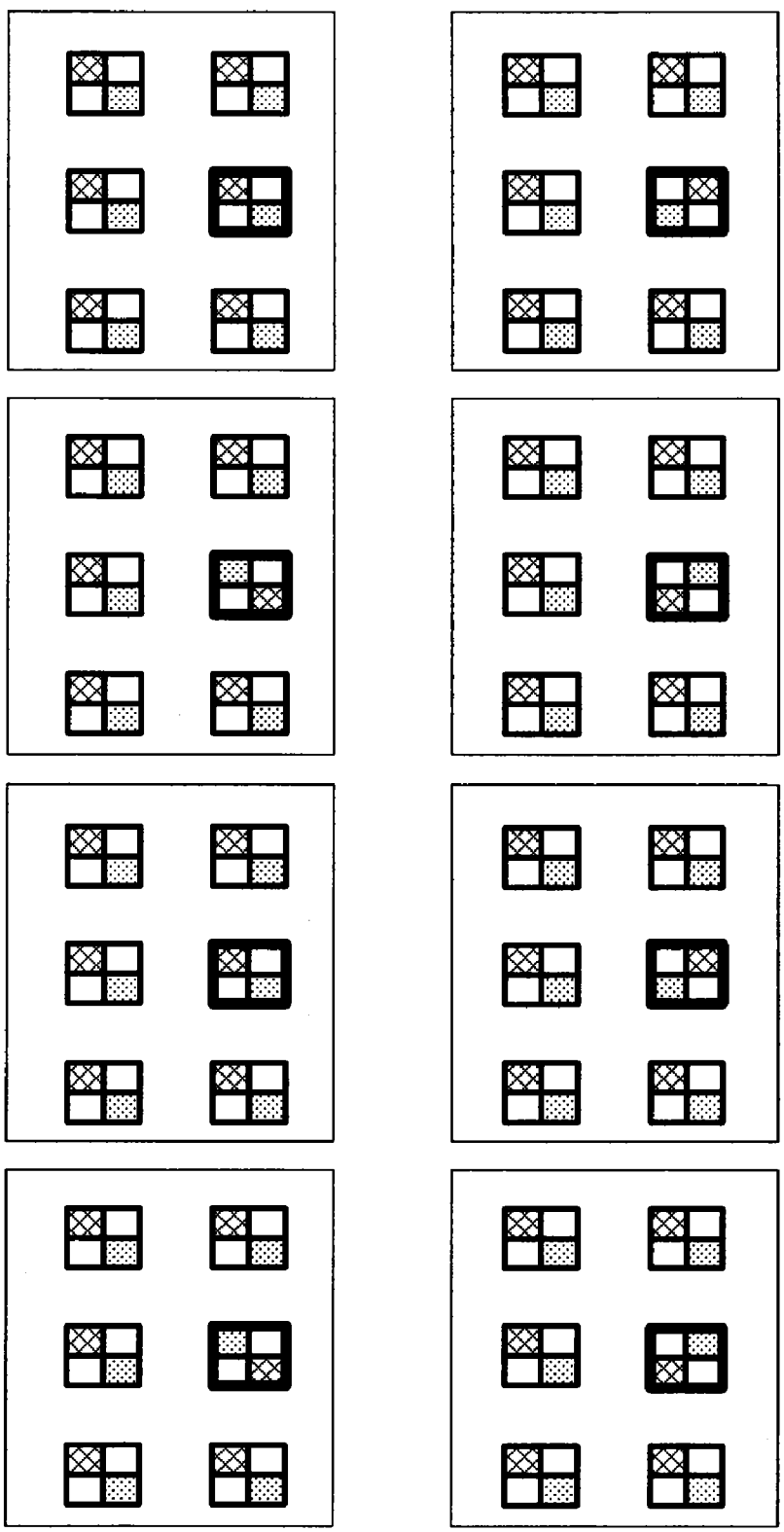
Figure 4D:
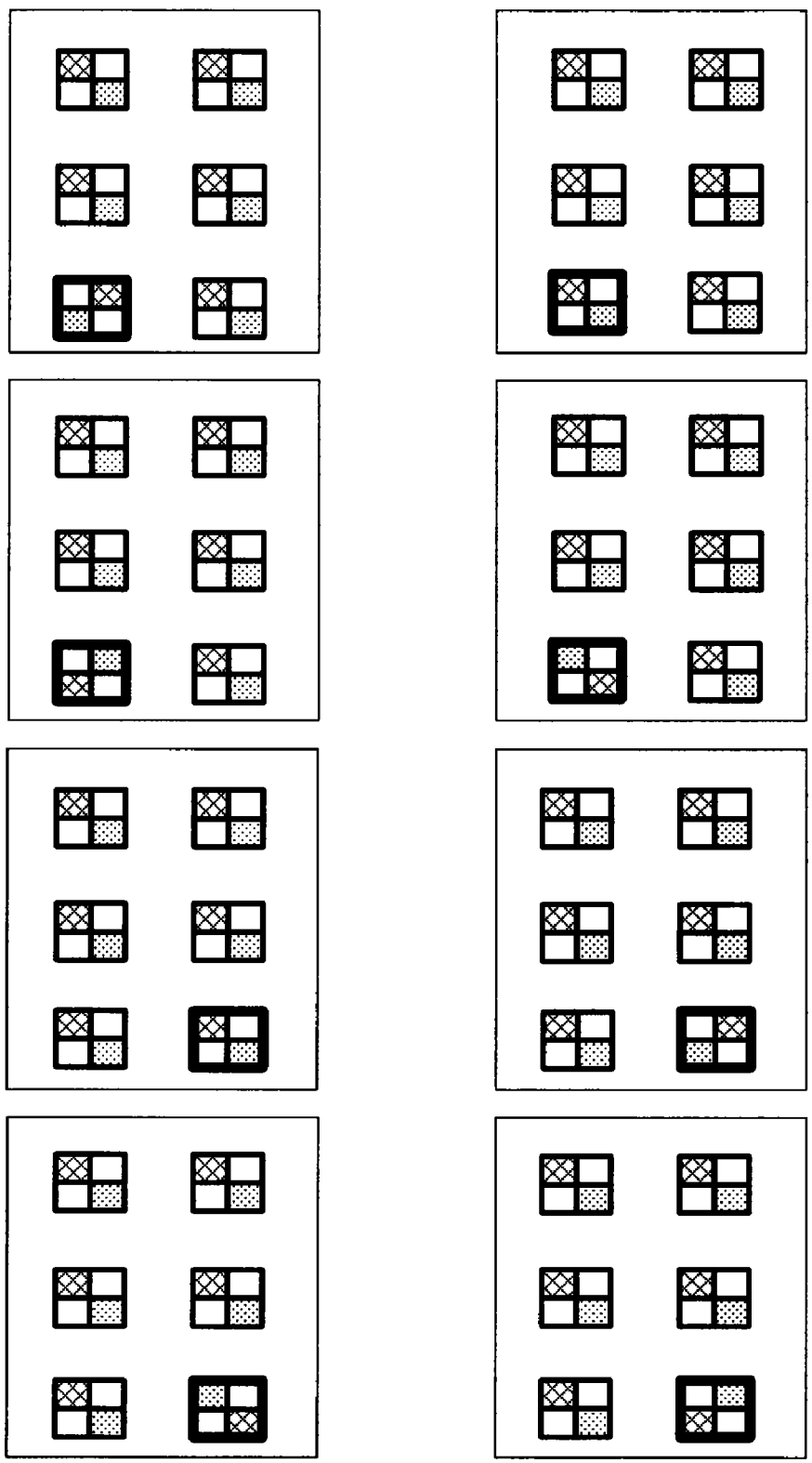
Figure 4E:
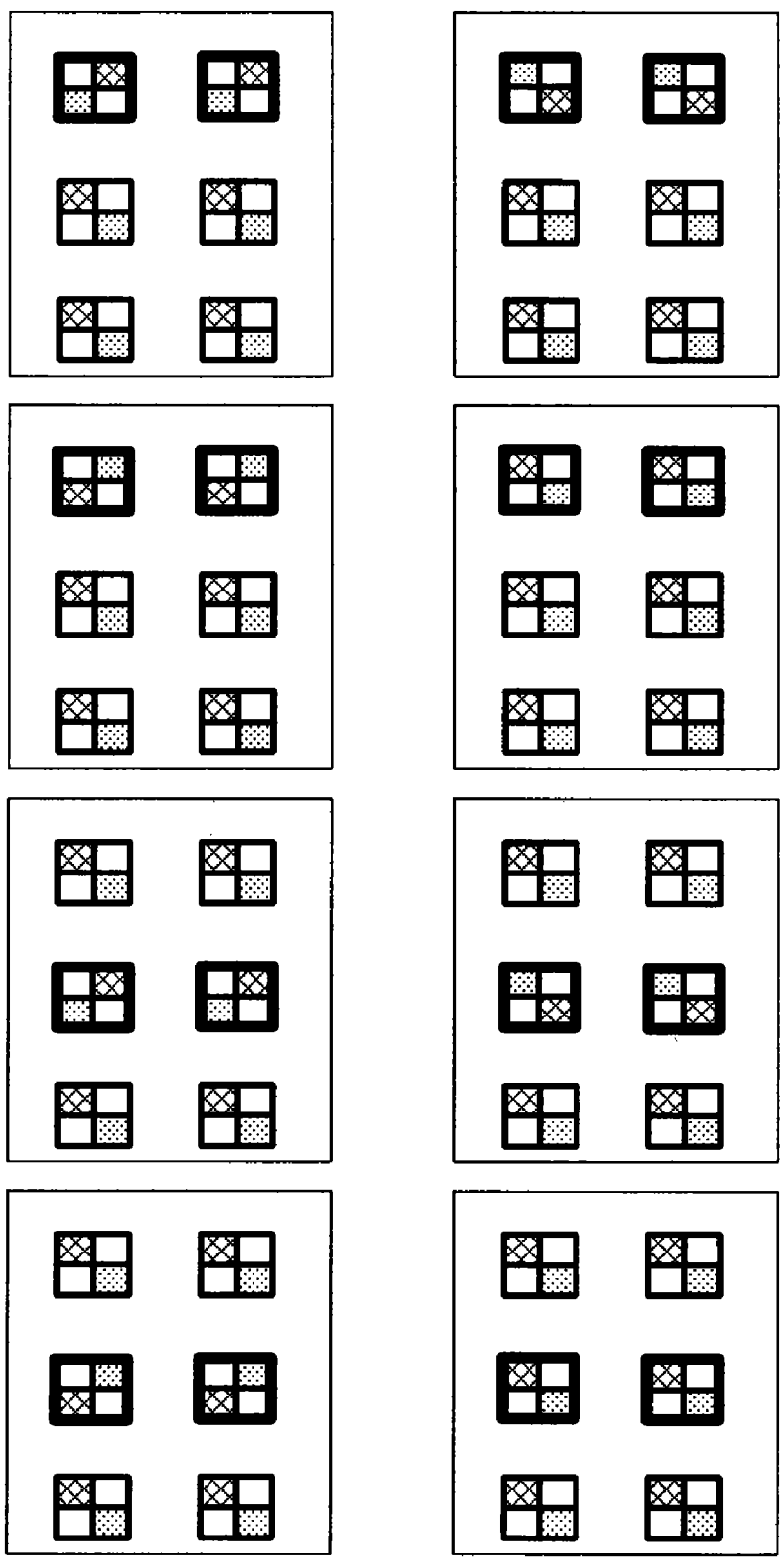
Figure 4F:
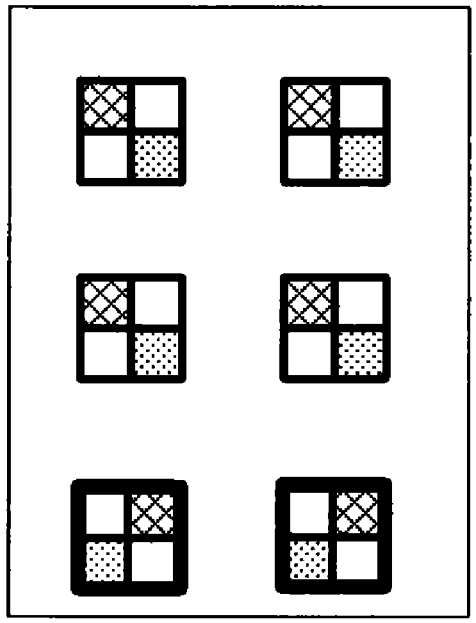
Figure 4F:
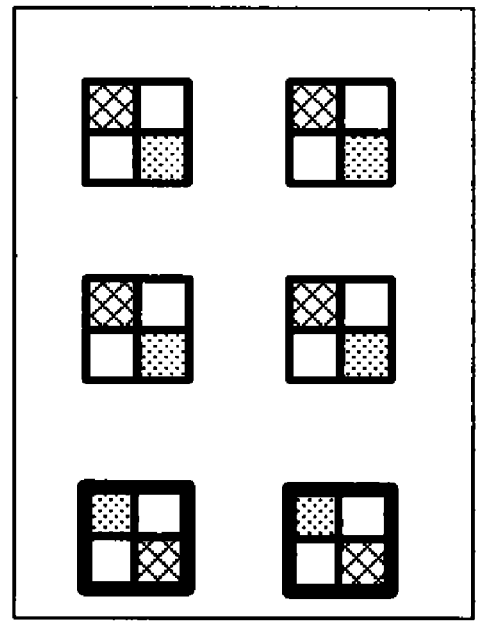
Figure 4F:
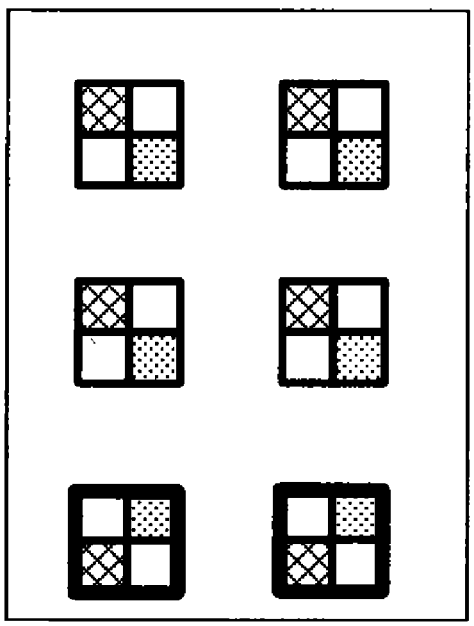
Figure 4F:
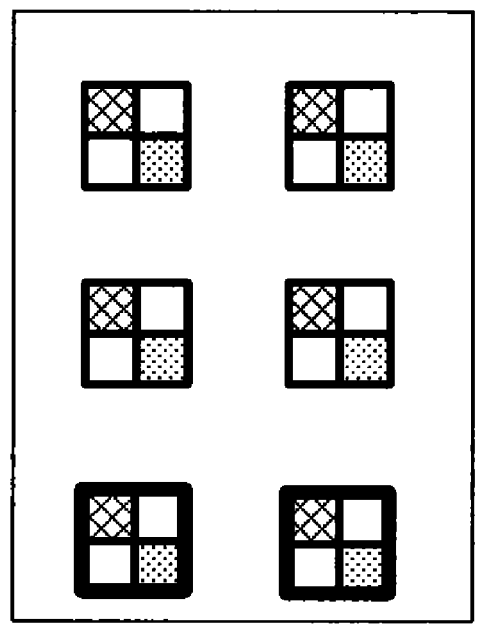
Figure 4G:
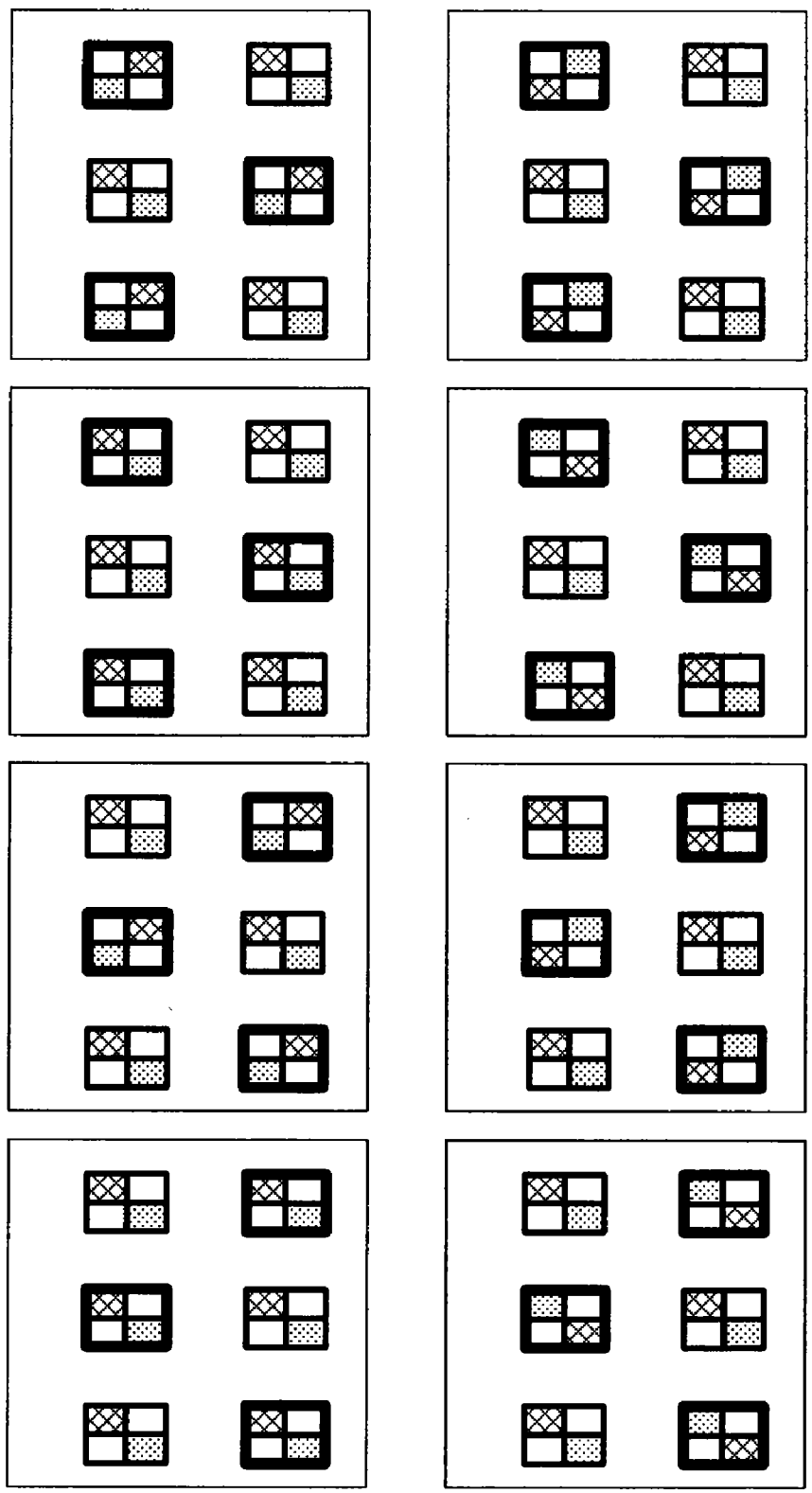
Figure 4H:
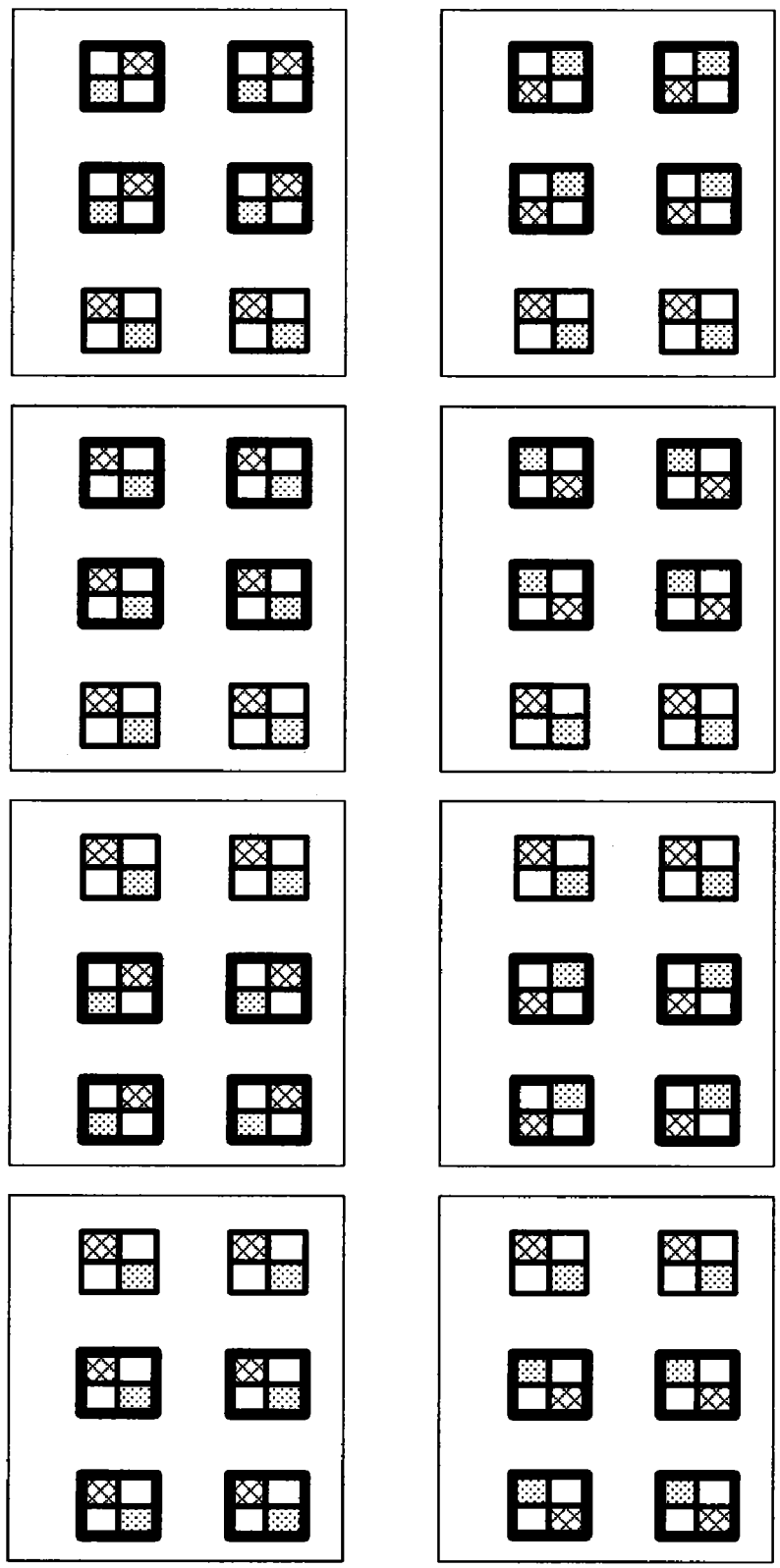
Figure 4I:
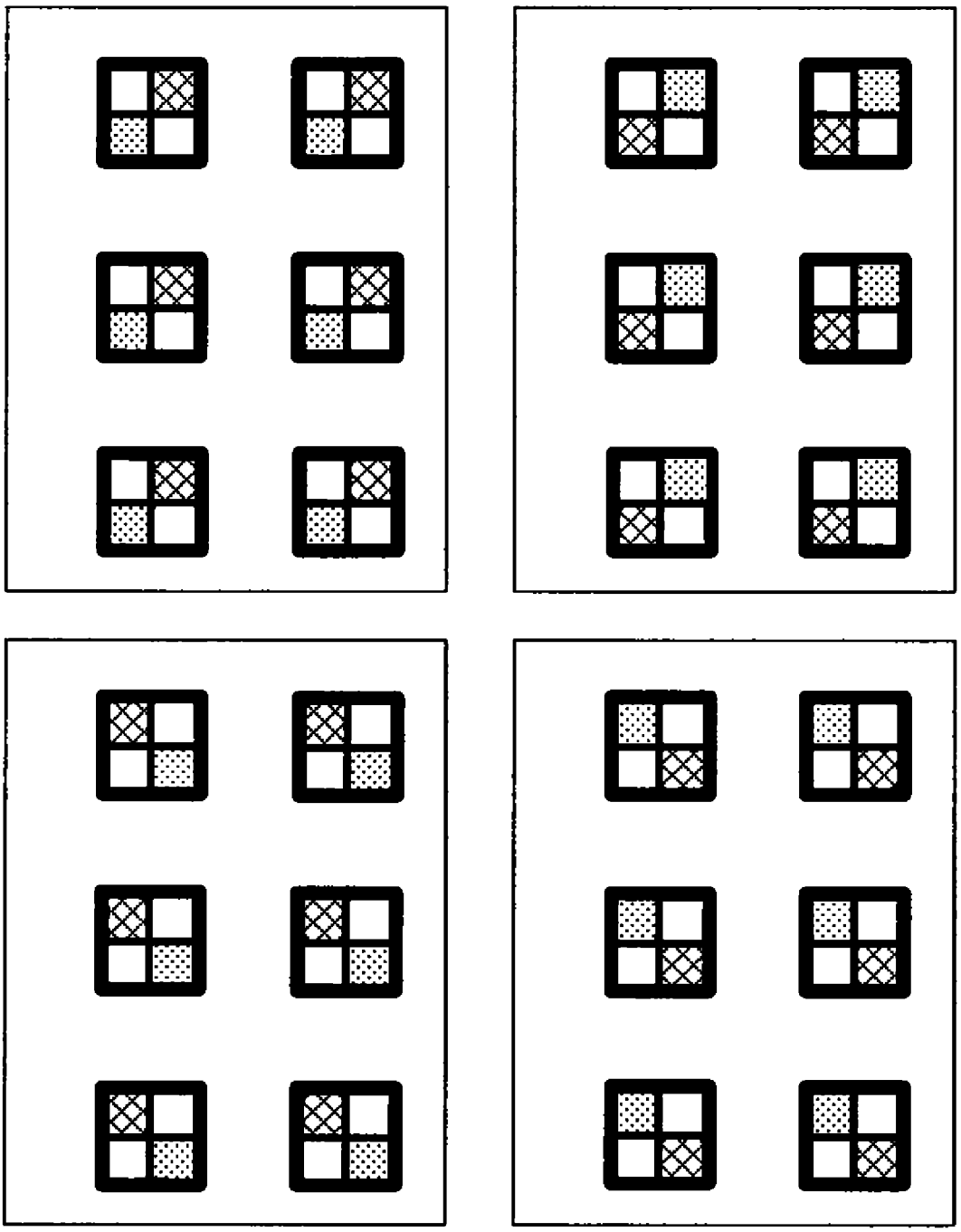

For example, FIG. 4B illustrates eight possible pilot patterns, each of which has six pilot structures. Since the each of the BS 21 and the SS 23 uses two antennas to communicate, each pilot structure has two pilots (FIG. 4B shows them in nonwhite grid). Each pilot pattern in FIG. 4B can be considered as an identifier of the SS 23. In other words, the pilot patterns in FIG. 4B can be identifiers of eight SSs respectively. Similarly, each of the pilot patterns in FIGS. 4B-4I can be an identifier of an SS.

Figure 5A:
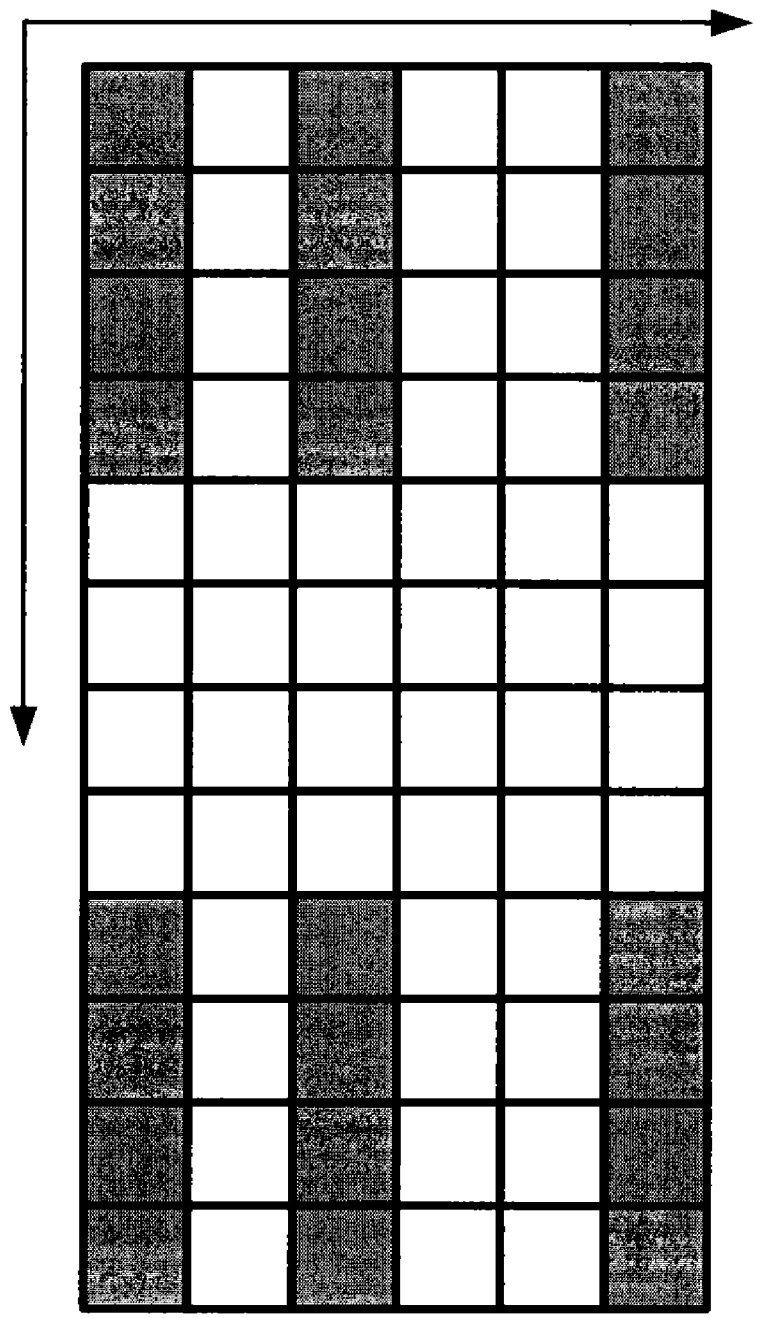
FIG. 5A illustrates another configuration of the pilot pattern of the first embodiment.
Figure 5B:
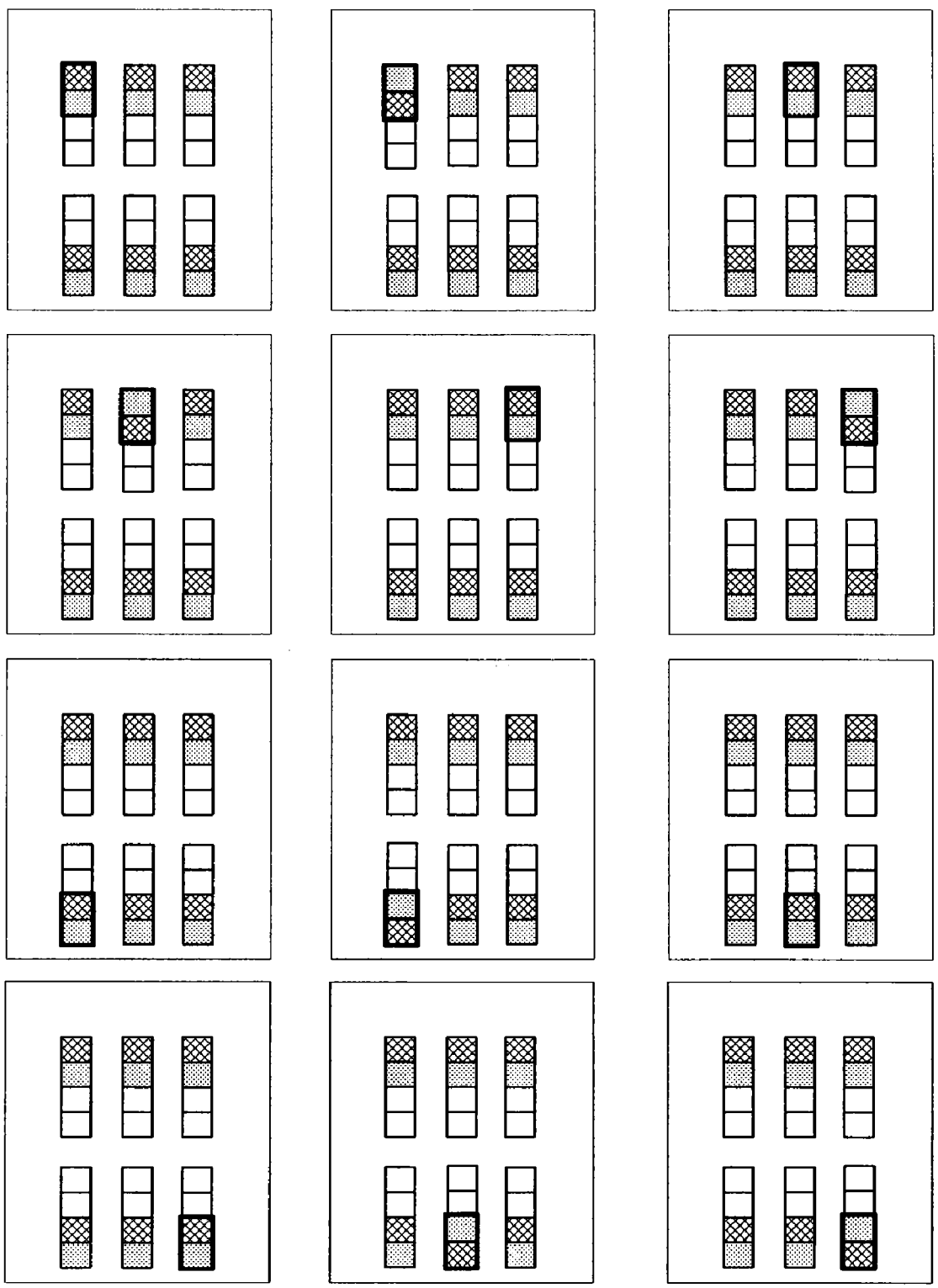
FIGS. 5B-5D illustrate variations of the another configuration of the pilot pattern of the first embodiment.
Figure 5C:
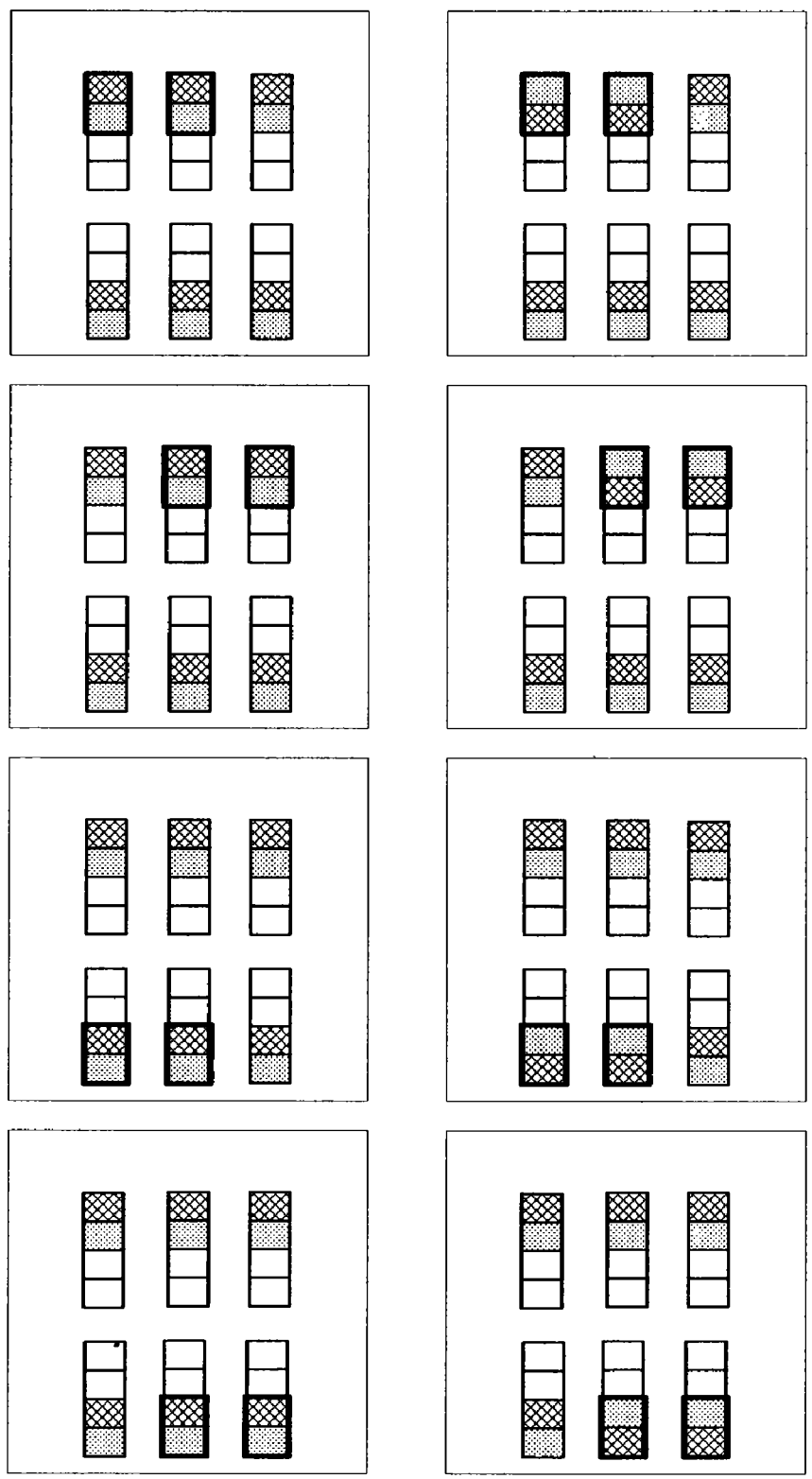
Figure 5D:
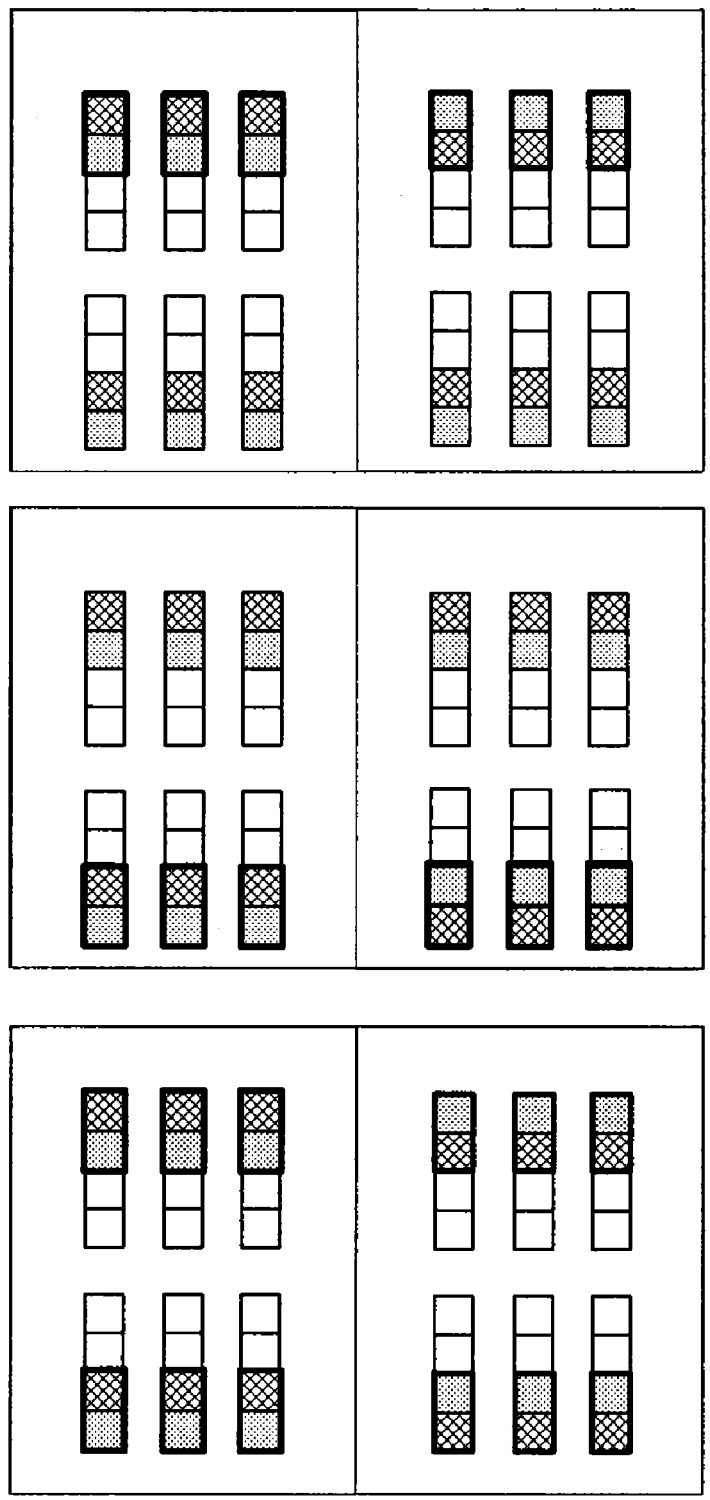

Please refer to FIG. 5A, which shows another configuration of the pilot pattern. In FIG. 5A, the horizontal axis represents "symbol", the vertical axis represents "subcarrier", the gray grid represents a pilot and the white grid represents data. The configuration of the pilot pattern will also be simplified as shown in FIGS. 5B-5D which just illustrates the pilot parts of FIG. 5A. Similarly, each of the pilot patterns in FIGS. 5B-5D can be an identifier of an SS.

After the generation module 213 of the BS 21 generates the super frame 214, the transceiver 215 configured to transmit the DL data to the SS 23 by the super frame 214 so that the SS 23 may receive the DL data after confirming the pilot pattern of the super frame 214 matches the identifier of the SS 23. Particularly, the SS 23 comprises a transceiver 231 and a confirmation module 233. The transceiver 231 of the SS 23 is configured to receive the pilot pattern 216 of the super frame 214. Then the confirmation module 233 is configured to confirm whether the pilot pattern 216 of the super frame 214 matches the identifier of the SS 23 and then generate a confirmation result 230.

If the confirmation result 230 indicates the pilot pattern 216 of the super frame 214 matches the identifier of the SS 23, the transceiver 231 is further configured to receive the DL data according to the confirmation result 230. In addition, since each of pilots in the pilot pattern 216 comprises the mitigation information, the transceiver 231 is further configured to overcome a transmission interference of the DL data according to the mitigation information after receiving the DL data.

Now the uplink (UL) transmission between the BS 21 and the SS 23 is described. The transceiver 231 of the SS 23 is further configured to transmit a UL data to the BS 21 by the super frame 214. Similar to the DL transmission between the BS 21 and the SS 23, the transceiver 215 of the BS 21 is configured to receive the pilot pattern 216 of the super frame 214 and confirm whether the pilot pattern 216 of the super frame 214 matches the ID of the SS 23. If so, the transceiver 215 of the BS 21 will receive the UL data and further overcome the transmission interference of the UL data according to the mitigation information after receiving the UL data.

Figure 6A:
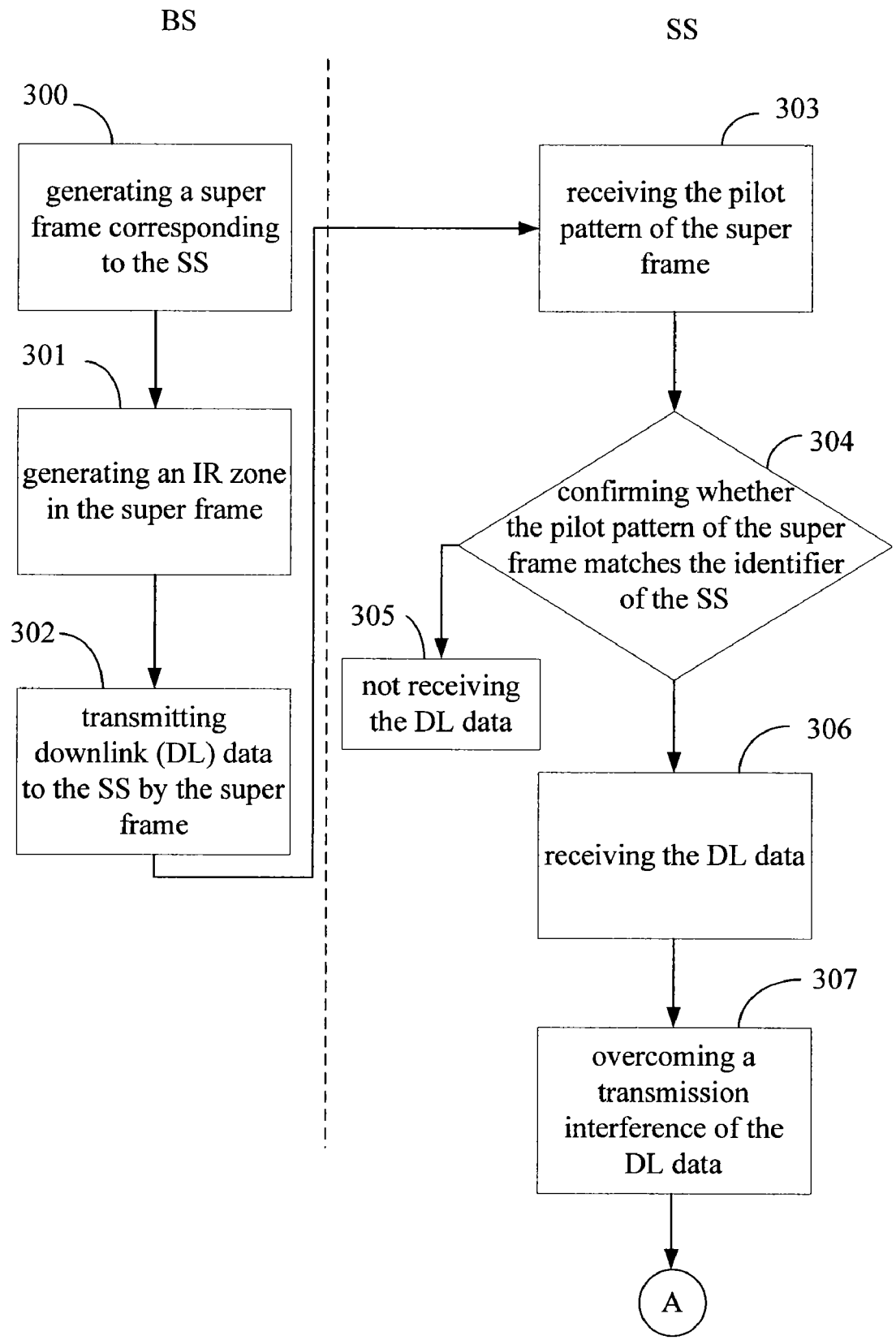
FIGS. 6A-6B illustrate a second embodiment of the present invention.
Figure 6B:
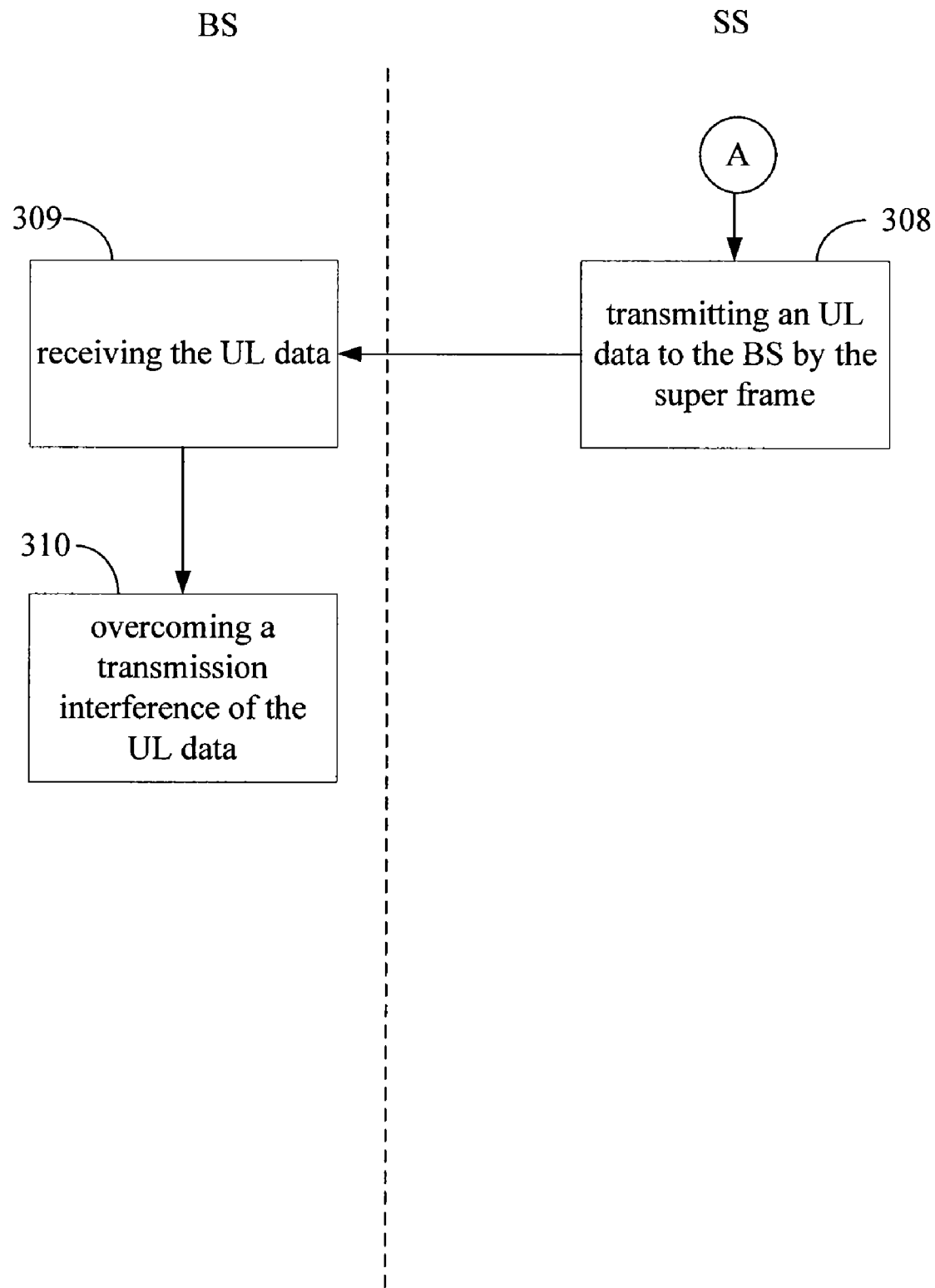

A second embodiment of the present invention is shown in FIGS. 6A-6B, which is a flow chart of a transmission method for use in the MIMO network 1 of the first embodiment. First, step 300 is executed to generate a super frame corresponding to the SS 23 according to the resource allocation information and the SS list. The super frame comprises a pilot pattern being arranged as an identifier of the SS 23. Step 301 is executed to generate an IR zone in the super frame, where the IR zone comprises the pilot pattern. Step 302 is executed to transmit DL data to the SS 23 by the super frame.

Then step 303 is executed to receive the pilot pattern of the super frame. Step 304 is executed to confirm whether the pilot pattern of the super frame matches the identifier of the SS 23 and generates a confirmation result. If the confirmation result is negative, step 305 is executed to stop receiving the DL data. If the confirmation result is positive, step 306 is executed to receive the DL data according to the confirmation result. Since the pilot pattern comprises a plurality of pilots, each of which comprises mitigation information, step 307 is executed to overcome a transmission interference of the DL data according to the mitigation information after receiving the DL data.

Step 308 is executed to transmitting a UL data to the BS 21 by the super frame. Step 309 is executed to receive the UL data after confirming the pilot pattern of the super frame matches the identifier of the SS 23. Finally, step 310 is executed to overcome a transmission interference of the UL data according to the mitigation information after receiving the UL data.

In addition to the steps shown in FIGS. 6A and 6B, this embodiment can also execute all the operations and functions of the above embodiments. Those of ordinary skill in the art will readily know how to execute the corresponding operations and functions in this embodiment by considering those in the first embodiment; therefore, a detailed description will be omitted here.

The method described above may be embodied in a computer readable medium storing the previously described computer program to execute the above steps. The computer readable medium may be a soft disk, a hard disk, a compact disk, a mobile disk, a magnetic tape, a database accessible via a network, or any storage medium that is known to those skilled in the art to have similar functions.

The present invention arranges a pilot pattern, which comprises a plurality of pilots, of the super frame as an identifier of an SS. No matter data transition in the TDD, FDD, the central zone edge or the cell zone edge, the BS and the SS will confirm whether the pilot pattern of the super frame matches the identifier of the SS which the BS/SS attempts to communicate with. If the confirmation result is positive, the communication will be proceeded. If the confirmation result is negative, the communication will be terminated. By confirming the pilot pattern, interference of transmission in the MIMO network will be reduced effectively, and the quality of communications will be enhanced effectively.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station (BS) for use in a multi-input multi-output (MIMO) network, the MIMO network including a subordinated station (SS) within a signal coverage of the BS, the BS comprising:
    a storage module, being configured to store resource allocation information about the MIMO network and an SS list;
    a generation module, being configured to generate a super frame corresponding to the SS according to the resource allocation information and the SS list, the super frame comprising a pilot pattern, the pilot pattern being arranged as an identifier of the SS, the pilot pattern comprising a plurality of pilots, each of the pilots comprising mitigation information; and
    a transceiver, being configured to transmit downlink (DL) data to the SS by the super frame so that the SS may receive the DL data after confirming the pilot pattern of the super frame matches the identifier of the SS, and may overcome a transmission interference of the DL data according to the mitigation information after receiving the DL data.

2. The BS as claimed in claim 1, wherein the SS transmits uplink (UL) data to the BS by the super frame, the transceiver is further configured to receive the UL data after confirming the pilot pattern of the super frame matches the identifier of the SS.

3. The BS as claimed in claim 2, wherein the transceiver is further configured to overcome a transmission interference of the UL data according to the mitigation information after receiving the UL data.

4. The BS as claimed in claim 1, wherein the generation module is further configured to generate an interference-reducing (IR) zone in the super frame, the IR zone comprises the pilot pattern.

5. A transmission method for use in a BS of an MIMO network, the MIMO network including a subordinated station (SS) within a signal coverage of the BS, the BS storing resource allocation information about the MIMO network and an SS list, the transmission method comprising the following steps of:
    generating a super frame corresponding to the SS according to the resource allocation information and the SS list, the super frame comprising a pilot pattern, the pilot pattern being arranged as an identifier of the SS, the pilot pattern comprising a plurality of pilots, each of the pilots comprising mitigation information; and
    transmitting downlink (DL) data to the SS by the super frame so that the SS may receive the DL data after confirming the pilot pattern of the super frame matches the identifier of the SS, and may overcome a transmission interference of the DL data according to the mitigation information after receiving the DL data.

6. The transmission method as claimed in claim 5, wherein the SS transmits a UL data to the BS by the super frame, the transmission method further comprises a step of receiving the UL data after confirming the pilot pattern of the super frame matches the identifier of the SS.

7. The transmission method as claimed in claim 6, wherein the transmission method further comprises a step of overcoming a transmission interference of the UL data according to the mitigation information after receiving the UL data.

8. The transmission method as claimed in claim 5, further comprising a step of generating an IR zone in the super frame, the IR zone comprises the pilot pattern.

9. A subordinated station (SS) for use in an MIMO network, the MIMO network comprising a BS, the SS being within a signal coverage of the BS, the BS being transmitting DL data to the SS by a super frame, the super frame comprising a pilot pattern, the pilot pattern being arranged as an identifier of the SS, the pilot pattern comprising a plurality of pilots, each of the pilots comprising mitigation information, the SS comprising:
   a transceiver, being configured to receive the pilot pattern of the super frame; and
   a confirmation module, being configured to confirm the pilot pattern of the super frame matches the identifier of the SS and then generate a confirmation result;
   wherein the transceiver is further configured to receive the DL data according to the confirmation result, and configured to overcome a transmission interference of the DL data according to the mitigation information after receiving the DL data.

10. The SS as claimed in claim 9, wherein the transceiver is further configured to transmit a UL data to the BS by the super frame so that the BS may receive the UL data after confirming the pilot pattern of the super frame matches the identifier of the SS.

11. A transmission method for use in an SS of an MIMO network, the MIMO network comprising a BS, the SS being within a signal coverage of the BS, the BS being transmitting DL data to the SS by a super frame, the super frame comprising a pilot pattern, the pilot pattern being arranged as an identifier of the SS, the pilot pattern comprising a plurality of pilots, each of the pilots comprising mitigation information, the transmission method comprising the following steps of:
   receiving the pilot pattern of the super frame;
   confirming the pilot pattern of the super frame matches the identifier of the SS;
   generating a confirmation result;
   receiving the DL data according to the confirmation result; and
   overcoming a transmission interference of the DL data according to the mitigation information after receiving the DL data.

12. The transmission method as claimed in claim 11, further comprising a step of transmitting a UL data to the BS by the super frame so that the BS may receive the UL data after confirming the pilot pattern of the super frame matches the identifier of the SS.

\* \* \* \* \*